(12) United States Patent
Cruz et al.

(10) Patent No.: US 8,753,110 B2
(45) Date of Patent: Jun. 17, 2014

(54) VENTED PROPANE COMBUSTION CHAMBER FOR INSECT ATTRACTANT ENGINE

(75) Inventors: Robert T. Cruz, Wrightsville, PA (US); Richard L. Eyer, Lititz, PA (US); Marko Konstantin Lubic, Shillington, PA (US); Christopher Kamery, Lancaster, PA (US)

(73) Assignee: Woodstream Corporation, Lititz, PA (US)

( * ) Notice: Subject to any disclaimer, the term of this patent is extended or adjusted under 35 U.S.C. 154(b) by 999 days.

(21) Appl. No.: 12/801,087

(22) Filed: May 20, 2010

(65) Prior Publication Data

US 2011/0283598 A1    Nov. 24, 2011

(51) Int. Cl.
   *F23M 5/00*   (2006.01)
(52) U.S. Cl.
   USPC .............................. 431/114; 431/354; 43/107
(58) Field of Classification Search
   USPC ......... 431/354, 10, 114, 351, 9, 12, 116, 181; 126/91 A, 91 R, 104 A; 43/107, 112
   See application file for complete search history.

(56) References Cited

U.S. PATENT DOCUMENTS

| | | | | |
|---|---|---|---|---|
| 1,488,238 A | * | 3/1924 | Good | 431/62 |
| 1,606,390 A | * | 11/1926 | Schmuck | 432/222 |
| 2,563,253 A | * | 8/1951 | Levin | 126/374.1 |
| 2,632,503 A | * | 3/1953 | Bailey | 122/6.5 |
| 2,887,074 A | * | 5/1959 | Friedberg | 110/252 |
| 3,570,471 A | * | 3/1971 | Lazaridis | 126/91 A |
| 5,040,970 A | * | 8/1991 | Riehl | 431/264 |
| 5,112,218 A | * | 5/1992 | Sigler | 431/266 |
| 6,145,243 A | | 11/2000 | Wigton et al. | |
| 6,662,489 B2 | * | 12/2003 | Spiro et al. | 43/107 |
| 6,718,685 B2 | * | 4/2004 | Bossler | 43/107 |
| 6,877,980 B2 | * | 4/2005 | Stephens et al. | 431/115 |
| 6,881,053 B2 | * | 4/2005 | Stephens et al. | 431/9 |
| 7,281,351 B2 | | 10/2007 | Durand et al. | |
| 7,802,398 B2 | * | 9/2010 | Kulkarni et al. | 43/139 |
| 2003/0084604 A1 | * | 5/2003 | Durand et al. | 43/139 |
| 2004/0139648 A1 | * | 7/2004 | Durand et al. | 43/139 |
| 2005/0210737 A1 | * | 9/2005 | Durand et al. | 43/139 |
| 2005/0246945 A1 | * | 11/2005 | Evink | 43/139 |
| 2006/0117646 A1 | * | 6/2006 | Dai | 43/139 |
| 2008/0092433 A1 | * | 4/2008 | Durand et al. | 43/107 |

* cited by examiner

*Primary Examiner* — Craig Schneider
*Assistant Examiner* — Jessica Cahill
(74) *Attorney, Agent, or Firm* — Jacobson Holman, PLLC.

(57) ABSTRACT

A vented combustion chamber for an insect attractant engine is provided for a flying insect trapping device of the type that relies upon combustion of a fuel to generate a flow of carbon dioxide to attract flying insects. The combustion chamber, which is generally tubular and horizontally oriented in operation, is vented through a hole formed in one side of the chamber wall that extends from the outer surface of the chamber into the interior thereof. During operation of the device, this through-hole allows gas inside the chamber to be vented to the outside, changing the effective length of the combustion chamber for the purposes of wave generation is changed so that creation of a resonance cycle or standing wave, and the resulting acoustic phenomenon of howling, is prevented.

19 Claims, 11 Drawing Sheets

VENTED PROPANE COMBUSTION CHAMBER FOR INSECT ATTRACTANT ENGINE

BACKGROUND OF THE INVENTION

1. Field of the Invention

The present invention is related to the field of traps for flying insects such as mosquitos, no-see-ums, and other insects and, more particularly, to a vented combustion chamber for such a trap.

2. Description of the Related Art

Various flying insect traps have been developed that rely on a combustion chamber to generate a flow of carbon dioxide for attracting mosquitos and other flying insects toward the trap. One such trap is disclosed in U.S. Pat. No. 7,281,351 ("the '351 patent"), which is owned by the assignee of the present application and is hereby expressly incorporated by reference as if fully set forth herein.

During use of cordless insect trapping devices having tubular combustion chambers such as the device described in the '351 patent, conditions have arisen in which various operational parameters including low flow rate, relatively high heat, and unit geometry have combined in such a way that a self-amplifying standing wave is created in the combustion chamber. The result is that the combustion chamber acts as a Rijke's tube and will resonate to create an audible "howling" noise. This howling interferes with the device's ability to reach optimum operating temperature and can be bothersome to the user.

Therefore, a need exists for a cordless flying insect trapping device that uses a combustion chamber in which the Rijke's tube phenomenon does not occur.

SUMMARY OF THE INVENTION

In view of the foregoing, one object of the present invention is to overcome the difficulties of "howling" from the use of a tubular combustion chamber in an insect trapping device to generate a flow of carbon dioxide.

Another object of the present invention is to provide an insect trapping device in accordance with the preceding object having a combustion chamber that is vented so that a standing wave is not generated in the chamber.

A further object of the present invention is to provide an insect trapping device in accordance with the preceding objects in which the vent is formed by a hole in the side of the chamber body.

A still further object of the present invention is to provide an insect trapping device in accordance with the preceding objects in which the hole used for the vent is the existing through-hole into which the spark ignitor electrode assembly is mounted in the combustion chamber.

Yet another object of the present invention is to provide an insect trapping device in accordance with the preceding objects in which the vent is formed by reversing the mounting order of the spark ignitor electrode assembly and a thermistor assembly that shares a common mounting location with the spark ignitor, such reversal creating a gap between the mounting flange of the spark ignitor and the outer surface of the combustion chamber body that, together with an annular clearance between the spark ignitor and the through-hole, forms the vent.

Still another object of the present invention is to provide an insect trapping device having a combustion chamber that is vented to prevent formation of a standing wave by mounting the spark ignitor electrode assembly in an existing through-hole in the combustion chamber body using a mounting flange assembly that creates a gap between the mounting flange and the outer surface of the combustion chamber body that, together with an annular clearance between the spark ignitor and the through-hole, forms the vent.

Yet another object of the present invention is to provide an insect trapping device in accordance with the preceding object in which the mounting flange assembly includes a spacer or washer to create the gap.

A still further object of the present invention is to provide an insect trapping device in accordance with the preceding objects that is not complex in structure and which can be manufactured at low cost but yet efficiently eliminates standing wave formation and the howling that can result therefrom.

In accordance with these and other objects, the present invention is directed to an insect attractant engine having a combustion chamber for a flying insect trapping device of the type that relies upon combustion to generate a flow of carbon dioxide to attract flying insects such as mosquitos into the device. It has been surprisingly discovered that if the interior of the combustion chamber is vented to the outside atmosphere, the problem of howling can be addressed. During operation of the device, this venting allows gas inside the chamber, which is at a higher-than-atmospheric pressure, to exit the chamber to the outside of the device. As a result of this venting action, the effective length of the combustion chamber for the purposes of wave generation is changed so that creation of a resonance cycle or standing wave, and the resulting acoustic phenomenon of howling, is reduced or eliminated.

The foregoing and other objects and advantages which will become subsequently apparent reside in the details of construction and operation as more fully hereinafter described and claimed, reference being had to the accompanying drawings forming a part hereof, wherein like numerals refer to like parts throughout.

DETAILED DESCRIPTION OF THE PREFERRED EMBODIMENTS

Figure 1:
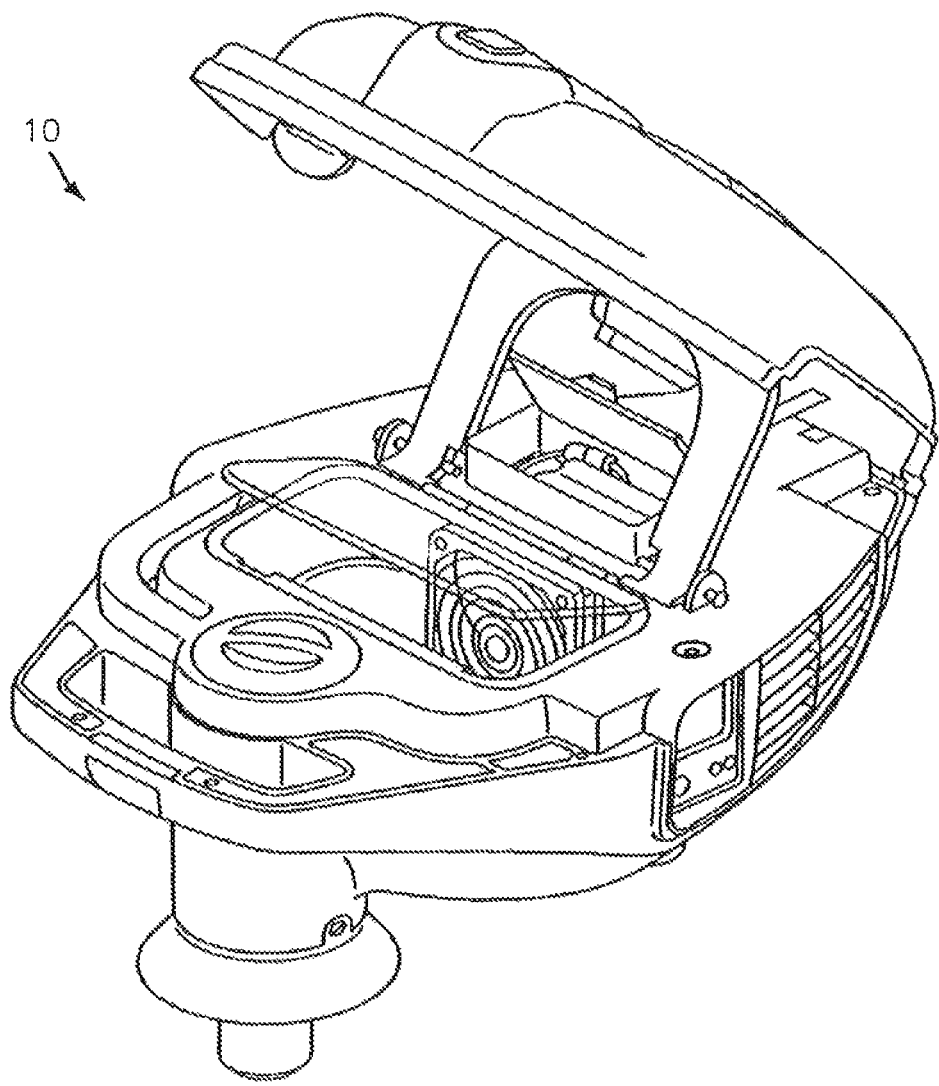
FIG. 1 shows a known insect trapping device that includes a conventional combustion chamber assembly.

In describing a preferred embodiment of the invention illustrated in the drawings, specific terminology will be resorted to for the sake of clarity. However, the invention is not intended to be limited to the specific terms so selected, and it is to be understood that each specific term includes all technical equivalents which operate in a similar manner to accomplish a similar purpose.

FIG. 1 shows an insect trapping device generally designated by reference numeral 10, of a type that may be modified to include the vented combustion chamber of the present invention. FIG. 1 is drawn from the '351 patent, previously incorporated by reference. Accordingly, the disclosure of the '351 patent is relied upon for a complete description of a representative trap to which the vented combustion chamber of the present invention may be applied and therefore such description will not be repeated here. Furthermore, the present invention is also suitable for use in other insect traps that rely on combustion to generate a flow of carbon dioxide for insect attraction, and is not intended to be limited to use as a modification of the '351 patent.

Figure 2:
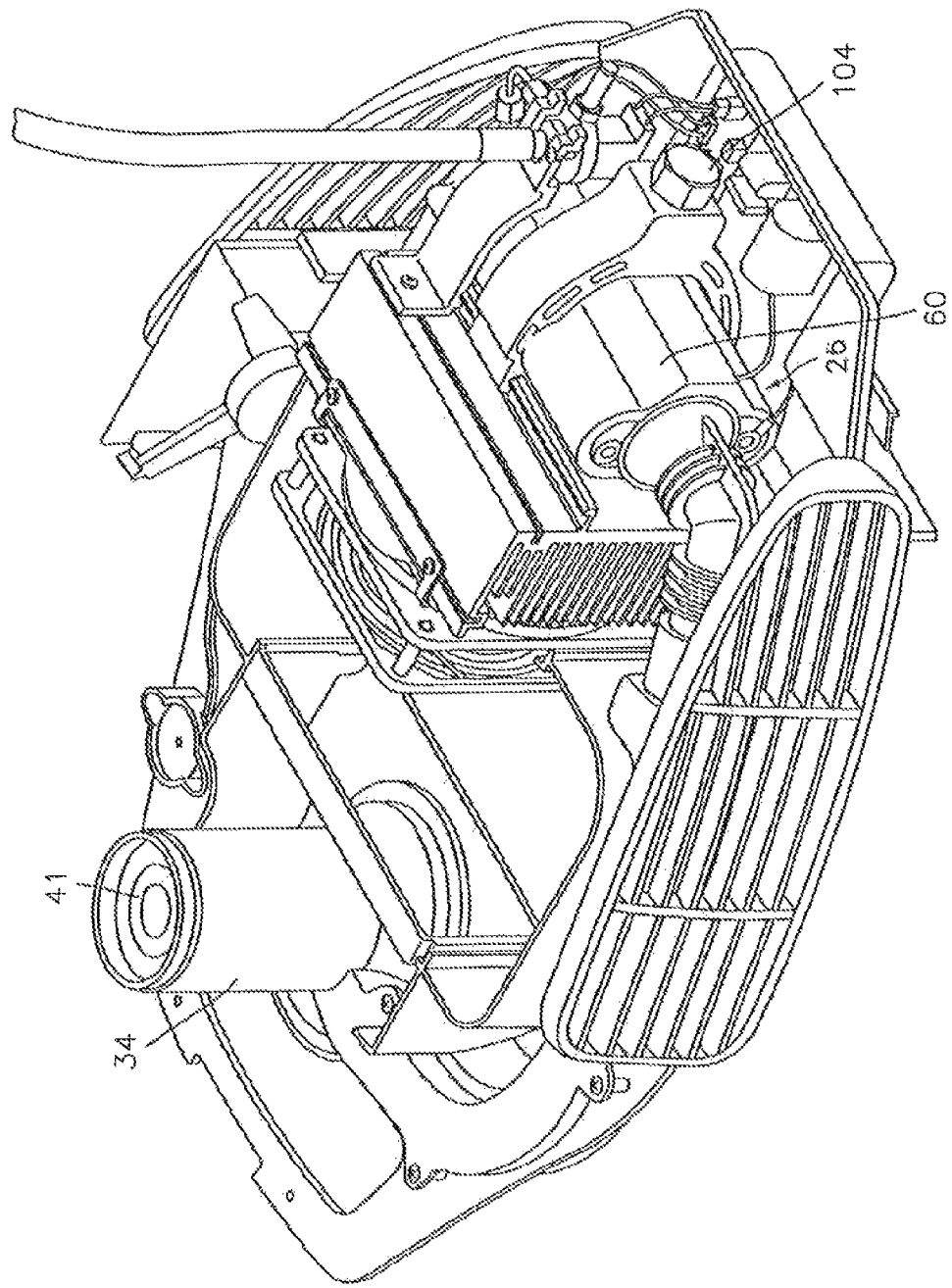
FIG. 2 shows the combustion chamber assembly of the trapping device shown in FIG. 1.
Figure 3:
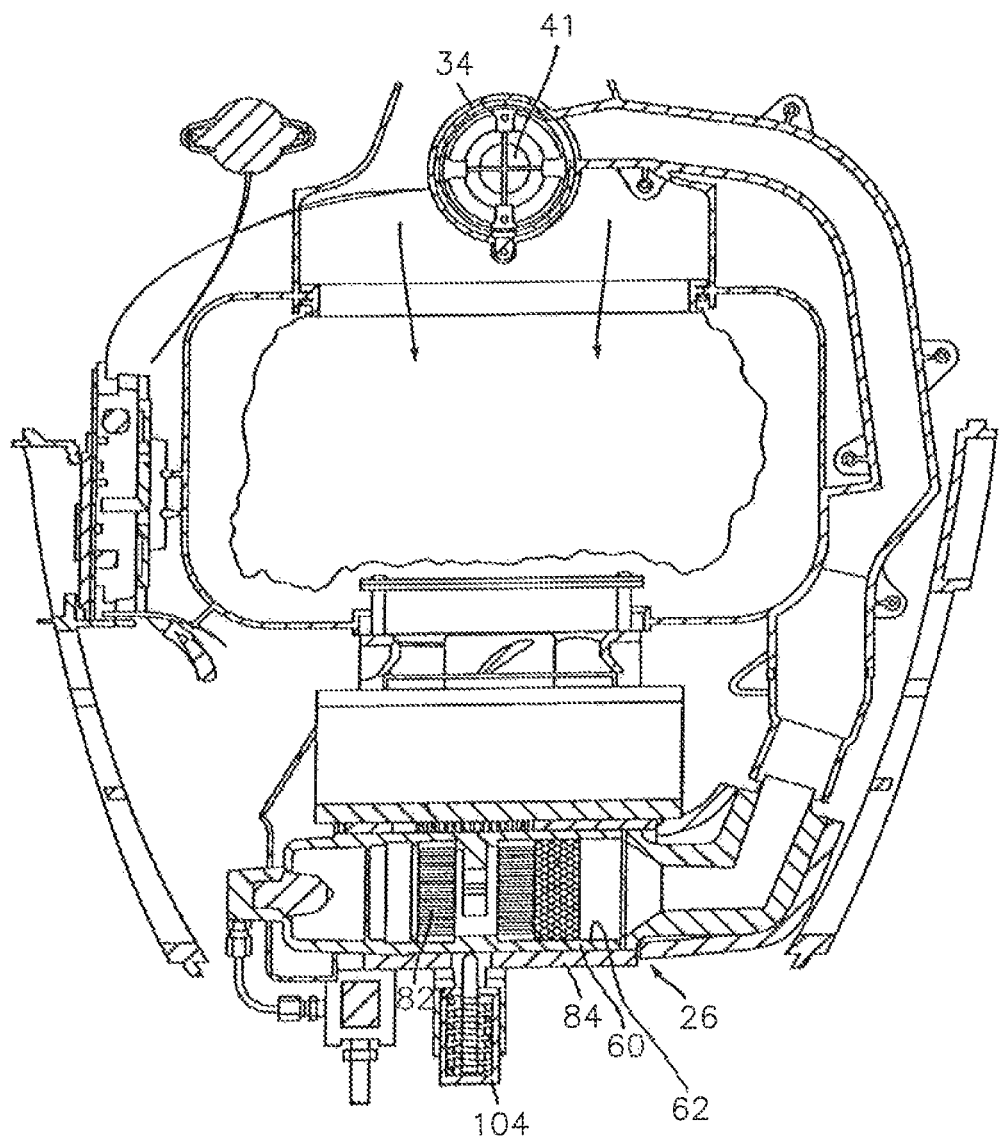
FIG. 3 is a cross-sectional vertical view of the trapping device and combustion chamber assembly of FIG. 1.

The combustion chamber assembly, generally designated by reference numeral 26, of the trapping device 10 of the '351 patent is shown in FIG. 2. The combustion chamber assembly 26 includes a combustion portion 60 having a combustion chamber 62 therein, shown in FIG. 3 also from the '351 patent. As evident from FIGS. 2 and 3, the combustion portion 60 is generally horizontal in orientation and, as shown in FIG. 3, has exhaust gases generated therein that are drawn vertically to an outlet nozzle 34 of the device 10 by an exhaust fan 41. While this may seem contrary to a conventional Rijke tube which has a vertical orientation and relies on the natural upwardly flowing movement of heated gas to generate the standing wave, the fan-forced air movement through the horizontally oriented, generally tubular chamber 62 of the device 10 creates the same effect, causing the chamber to emulate a Rijke tube. In addition, the internal components of the combustion portion 60, including catalytically active monolith 84 and flow straightener 82, emulate the wire mesh which is found in a conventional Rijke tube. As a result, under appropriate conditions, a self-amplifying standing wave is created in the combustion chamber 62 so that the combustion chamber, like a Rijke's tube, will audibly "howl".

To solve the combustion chamber howling problem, it has been surprisingly discovered that a vent in the side of the generally tubular combustion chamber 62 through which gas can flow from inside the combustion chamber to the outside atmosphere during operation of the device addresses this problem. Adding the vent in the body of the combustion chamber effectively changes the "tube length" of the chamber, making the chamber immune to the formation of a standing wave. As the pressure differential is always positive with respect to atmospheric pressure during device operation, airflow generated by combustion flows out of the vent, thereby preventing pressure build-up in the chamber and resonant wave formation.

Figure 4:
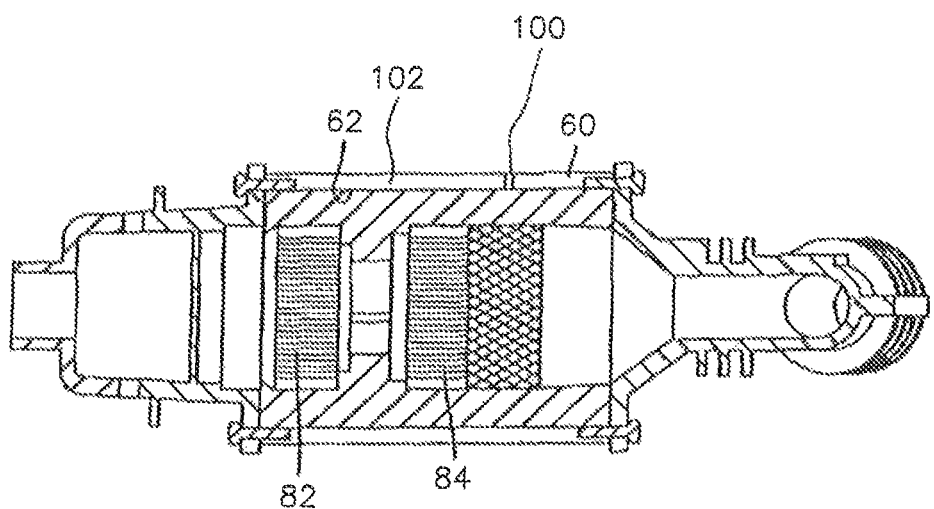
FIG. 4 is an isolated cross-sectional view of the combustion chamber of the combustion chamber assembly of FIG. 3 as modified with a hole to create a vent in accordance with a first embodiment of the present invention.

Most simply, according to a first embodiment of the present invention the vent is formed by drilling a hole 100 in the wall 102 of the chamber 62 that extends from the exterior surface of the chamber into the interior thereof as shown in FIG. 4. According to the present invention, a hole 100 having a diameter on the order of about 0.179 inches, and hence a cross-sectional area of about 0.025 square inches, is effective. Holes of different sizes are believed to work effectively, provided the hole size is large enough to prevent the standing wave and yet small enough not to disrupt the combustion in the chamber or allow excess leakage of heat and combustion gases from the chamber through the vent. It is believed that the diameter of the hole should be no greater than about 0.25 inches to work effectively, resulting in a vent cross-sectional area of about 0.05 square inches. The hole placement may also vary, provided the hole is positioned to extend from the outside atmosphere into the combustion chamber.

Figure 5:
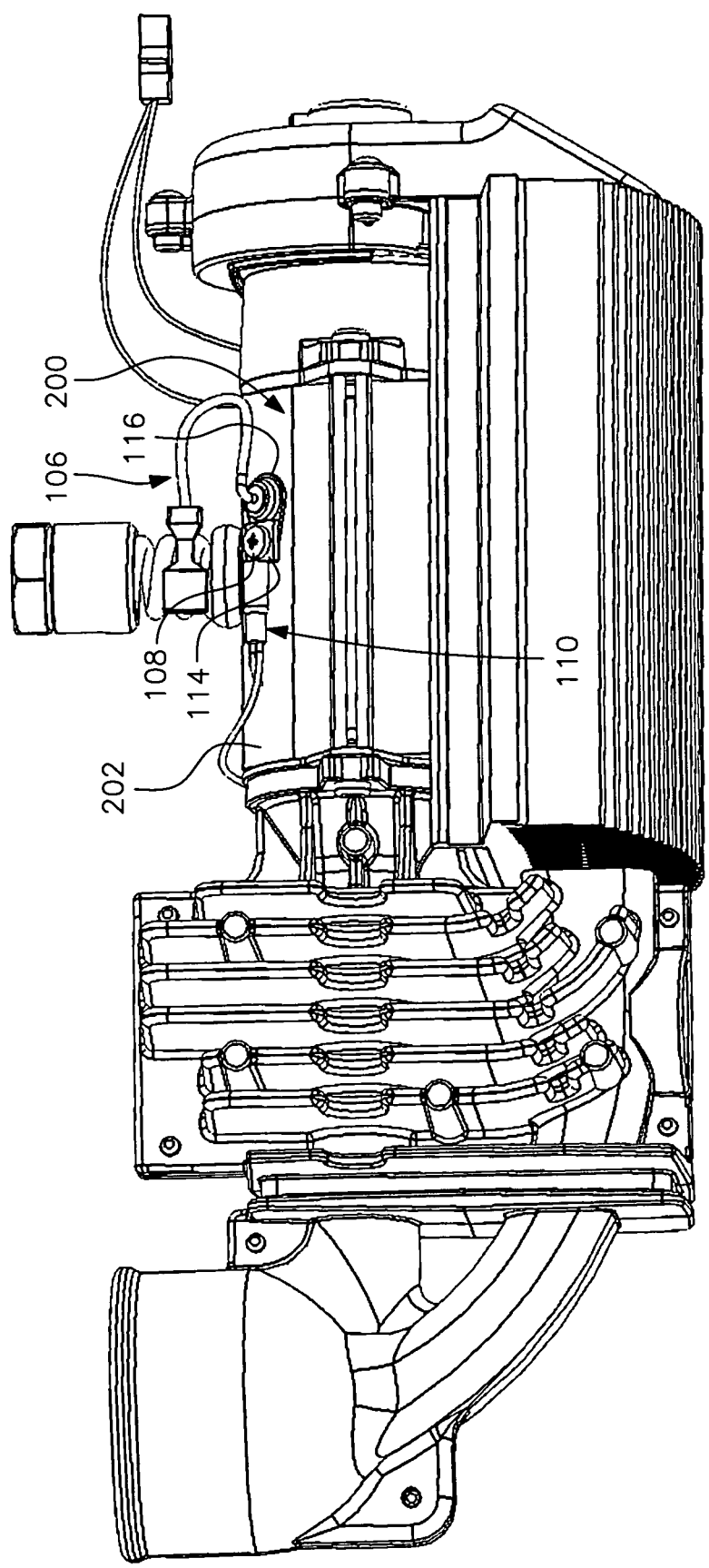
FIG. 5 is a known burner assembly having a combustion chamber with a conventionally mounted spark igniter electrode assembly and thermistor assembly.
Figure 6:
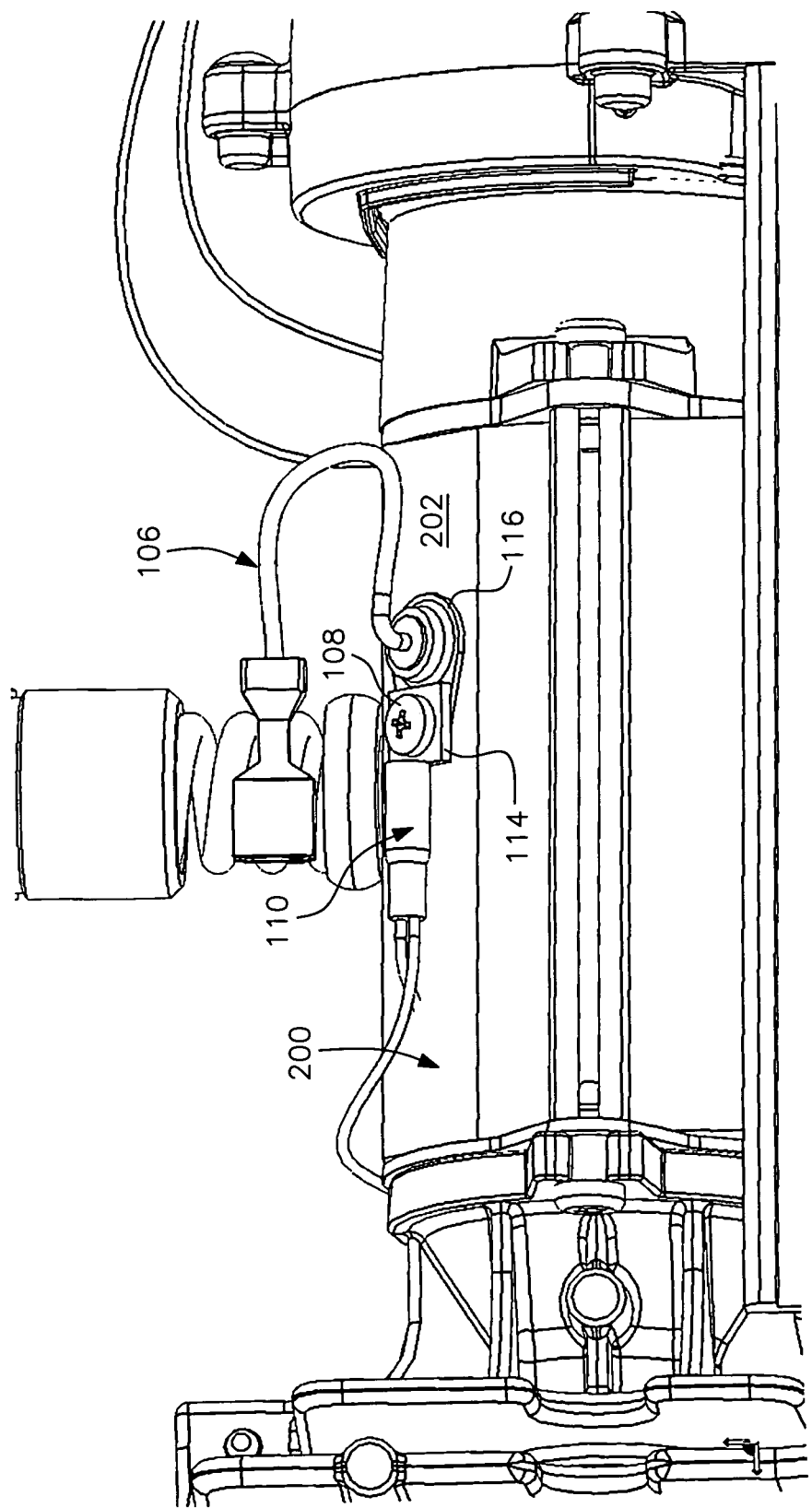
FIG. 6 is an enlarged view of the spark igniter electrode assembly and the thermistor assembly shown in FIG. 5.

Rather than drilling a separate hole in the wall 102 of the combustion chamber 62, however, a more preferred approach is to use the existing through-hole 104 formed in the wall 202 of the combustion chamber, generally designated by reference numeral 200, for mounting of the spark ignitor electrode assembly generally designated by reference numeral 106 (see FIGS. 9 and 13-15). Conventionally, the spark ignitor electrode assembly 106 is inserted within this through-hole 104 and secured to the exterior surface of the chamber using a fastening element or screw 108, as shown in FIGS. 5 and 6. The same fastening element is also used to secure the thermistor assembly, generally designated by reference numeral 110, as also shown. In the conventional mounting arrangement of these two components shown in FIGS. 5 and 6, the spark ignitor electrode assembly 106 is mounted first with the mounting flange 116 directly against the outer surface of the wall 202 of the combustion chamber 200. The thermistor assembly 110 is then mounted on top of the spark ignitor electrode assembly 106 using the same fastening element or screw 108 for attachment. When mounted, the ceramic insulator 112 of the spark ignitor electrode assembly 106 extends into the chamber 200 (see FIGS. 14 and 15).

Figure 7:
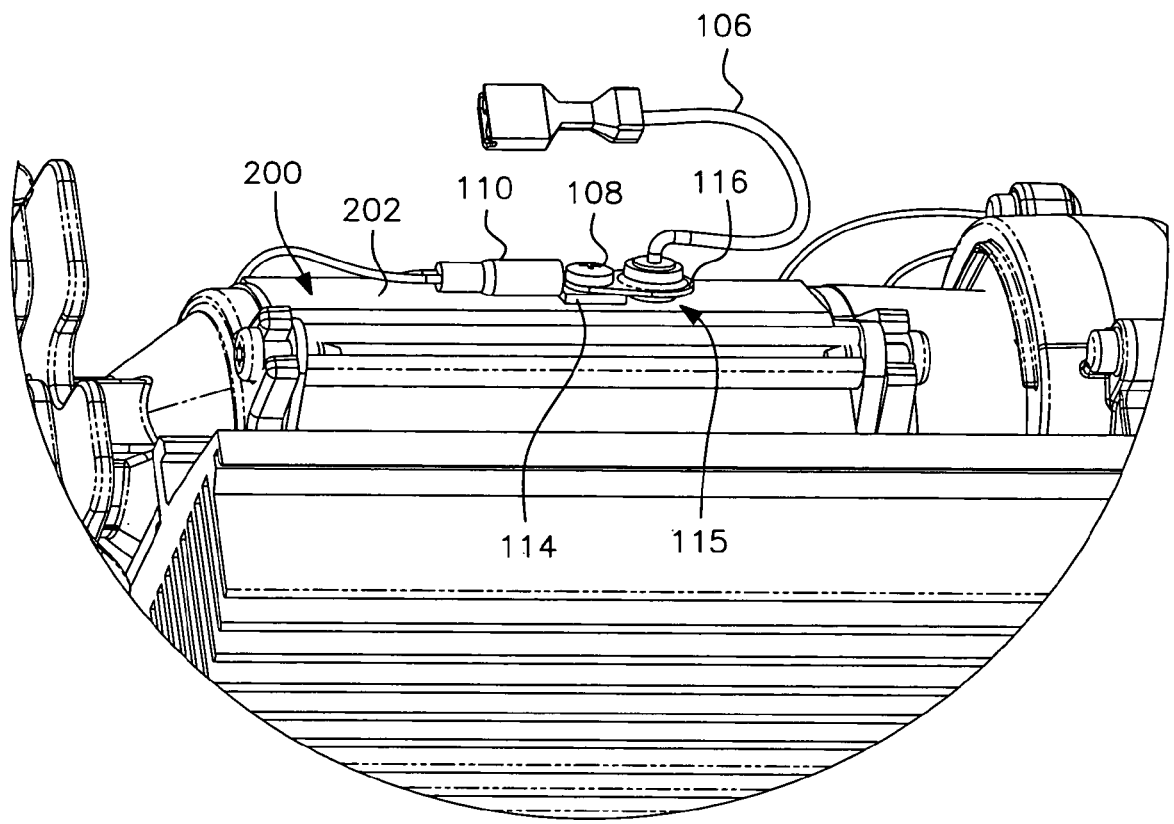
FIG. 7 shows a burner assembly having a combustion chamber with the spark igniter electrode assembly and thermistor assembly mounted in reverse order as compared with FIGS. 5 and 6, in accordance with a second embodiment of the present invention.
Figure 8:
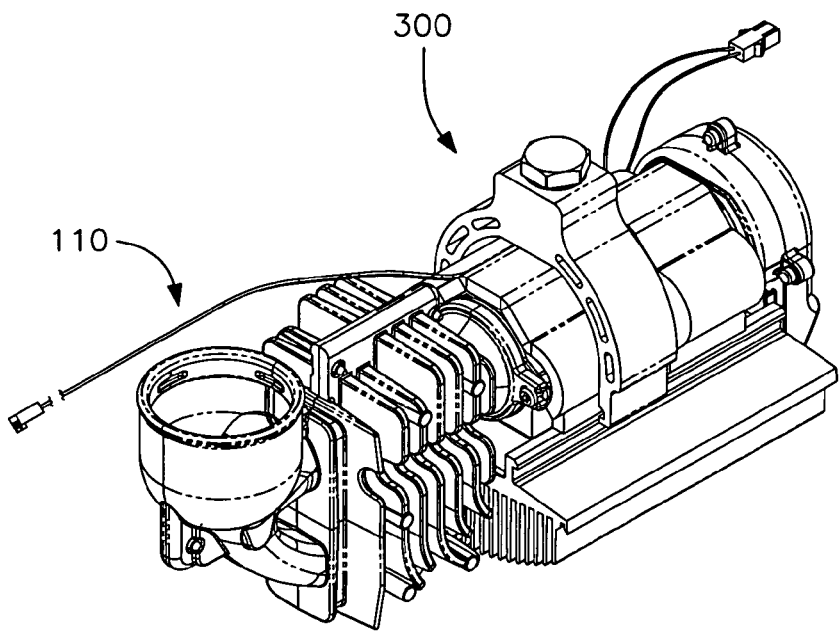
FIG. 8 is a perspective view of a thermoelectric generator engine having a burner assembly with a vented combustion chamber in accordance with a third embodiment of the present invention.
Figure 9:
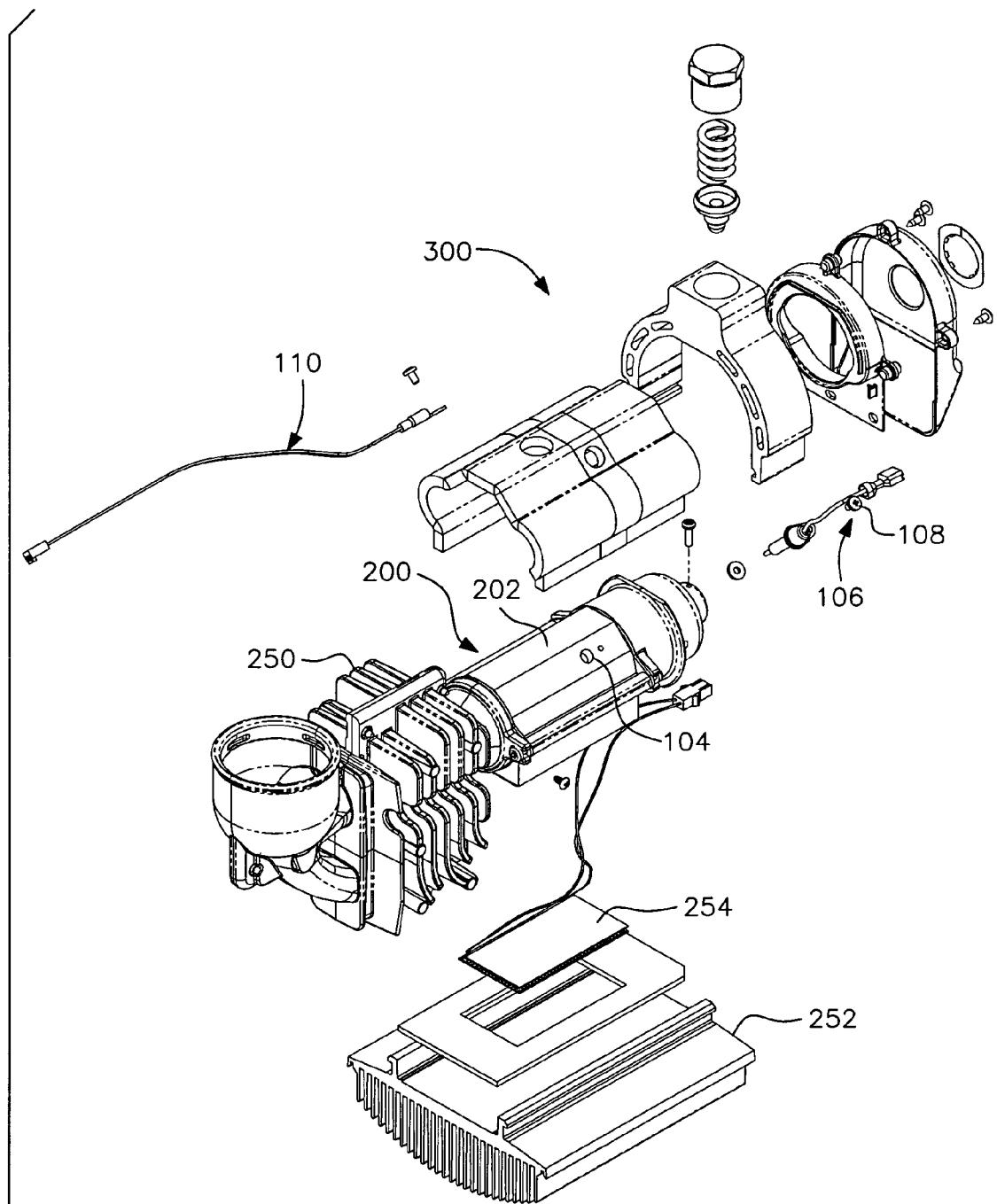
FIG. 9 is an exploded view of the components of the thermoelectric generator engine shown in FIG. 8.
Figure 10:
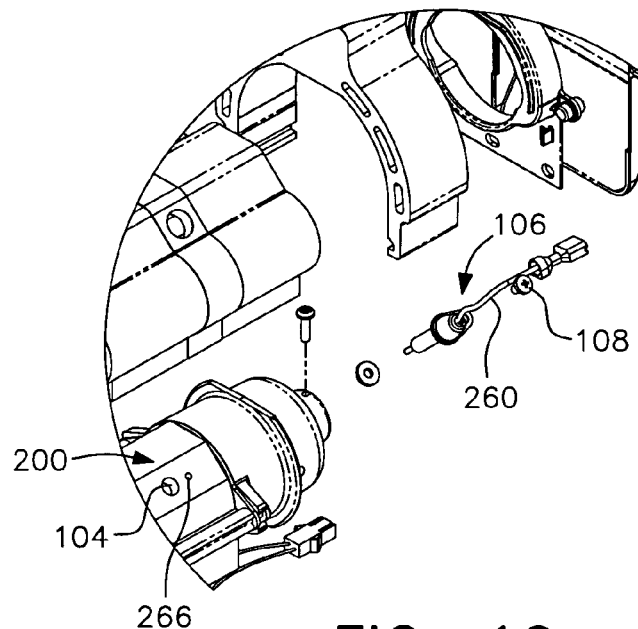
FIG. 10 is an enlarged view of Detail A of FIG. 9 showing the spark igniter electrode assembly.

Using the through-hole 104 to generate the vent in accordance with the present invention may be accomplished in at least two different ways. According to a second embodiment of the present invention, the vent is formed by reversing the mounting order of the spark igniter electrode assembly 106 and the thermistor assembly 110 as shown in FIG. 7. Hence, the thermistor assembly 110 is mounted to the combustion chamber wall first, and then the spark ignitor electrode assembly 106 is mounted on top of the thermistor assembly mounting flange 114, with both components again sharing the same screw 108 for attachment. However, unlike in the conventional assembly orientation, in the assembly orientation according to the present invention, the thermistor assembly mounting flange 114 creates a gap, generally designated by reference numeral 115, between the mounting flange 116 of the spark ignitor electrode assembly 106 and the outer wall 202 of the combustion chamber 200. This gap 115, in combination with the annular area 280 (see FIG. 15) provided by the clearance between the inner diameter of the through-hole 104 in the combustion chamber and the outer surface of the ceramic insulator 112, completes the vent.

As in the case of the first embodiment, the cross-sectional area formed by the annular clearance between the through-hole and the ceramic insulator is preferably about 0.025 square inches and should not exceed about 0.05 square inches. The size of the gap between the mounting flange and the outer wall of the combustion chamber is dependent on the thickness of the thermistor flange, which is generally on the order of about 0.060 inches. However, it is believed that the size of the gap may vary provided the cross-sectional area of the open annular clearance between the insulator and the through-hole is between about 0.025 square inches and about 0.05 square inches. However, the gap should not be less than about 0.026 inches so that the gap does not obstruct the venting action provided by the annular clearance.

FIGS. 8-15 illustrate a third preferred embodiment of a vented combustion chamber in accordance with the present invention that also relies on the existing through-hole 104 for mounting the spark ignitor electrode assembly. In this embodiment, the chamber 200 is part of a thermoelectric generator engine generally designated by reference numeral 300. The thermoelectric generator engine 300 includes a burner assembly, generally designated by reference numeral 250, with the chamber 200 therein that transfers heat to a heat sink 252 through a thermoelectric (TE) module 254. The function and operation of the TE module 254 is discussed in the '351 patent and more fully described in U.S. Pat. No. 6,145,243 ("the '243 patent"). The '243 patent is owned by the assignee of the present application and is hereby expressly incorporated by reference as if fully set forth herein.

As in the previous embodiments, the combustion chamber 200 is generally horizontal in orientation, with the thermistor assembly 110 and the spark ignitor electrode assembly 106 mounted to the wall 202 of the combustion chamber 200. In this third embodiment, however, the thermistor assembly 110 is mounted at a separate location (not shown) from the spark ignitor electrode assembly 106 and plays no part in vent formation.

Figure 11:
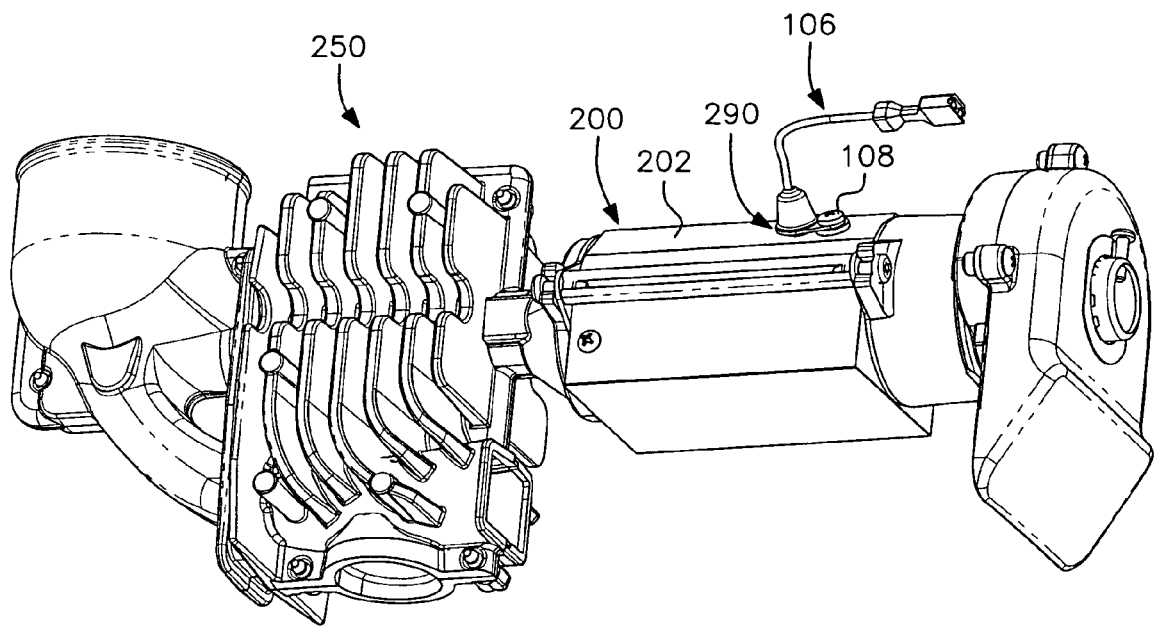
FIG. 11 is an assembled view of the spark igniter electrode assembly and the burner assembly of FIG. 8.
Figure 12:
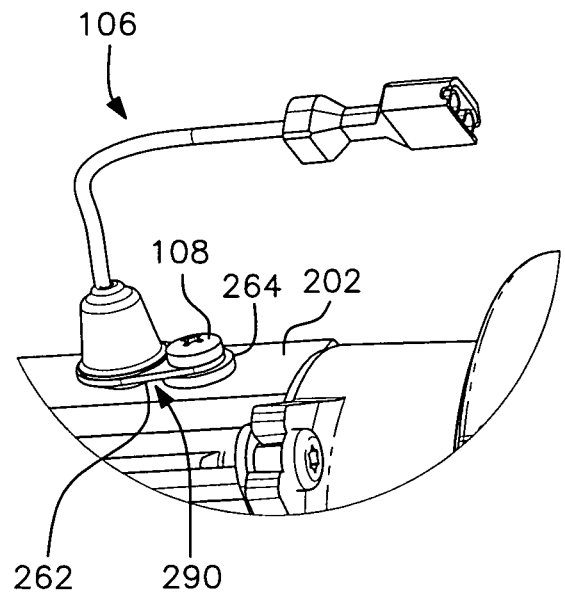
FIG. 12 is an enlarged view of the spark igniter electrode assembly of FIG. 11.
Figure 13:
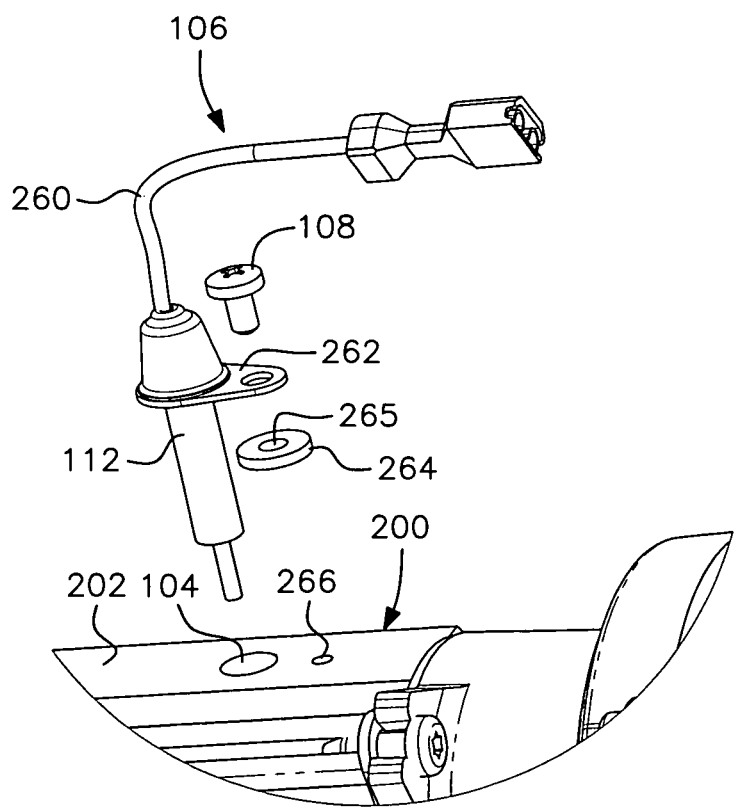
FIG. 13 is an exploded view of the spark igniter electrode assembly shown in FIGS. 11 and 12.
Figure 14:
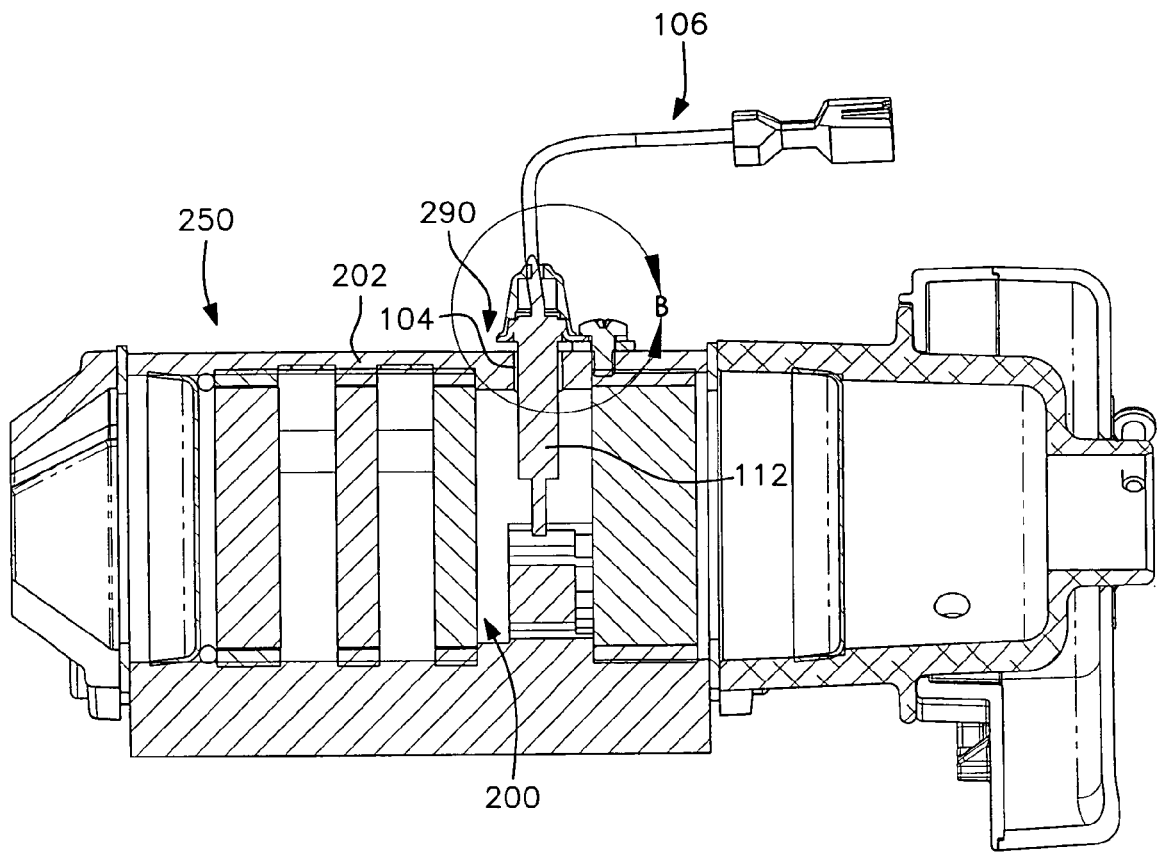
FIG. 14 is a cross-sectional view of the combustion chamber and the spark igniter electrode assembly of FIG. 11.

FIGS. 11, 12 and 14 illustrate the spark ignitor electrode assembly 106 as mounted to the wall 202 of the combustion chamber 200. FIG. 13 shows the spark ignitor electrode assembly in exploded view as separated from the combustion chamber. The spark ignitor electrode assembly includes the spark ignitor electrode 260, a mounting flange 262, a washer 264 and a fastening element such as screw 108. The electrode is received within the through-hole 104 in the combustion chamber wall 202, and the screw 108 is secured within an aperture 266 formed next to the through-hole 104.

Figure 15:
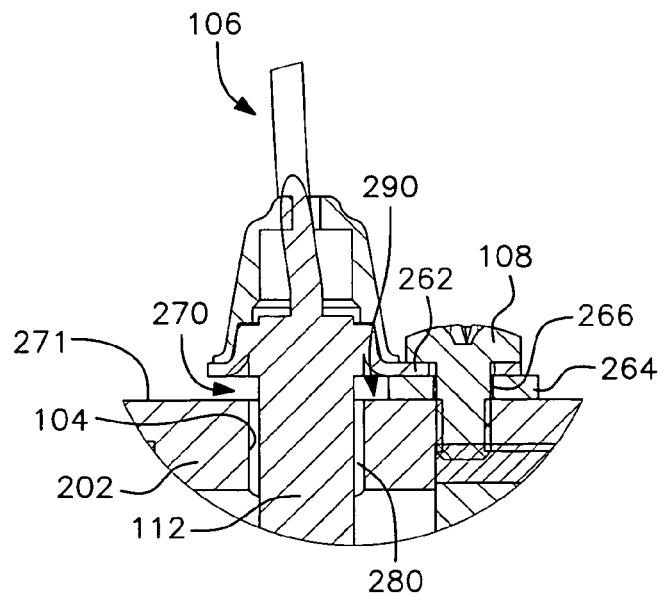
FIG. 15 is an enlarged view of Detail B of FIG. 14 showing the spark igniter electrode assembly.

The cross-sectional views of FIGS. 14 and 15 provide the best view of the gap, generally designated by reference numeral 270, formed between the mounting flange 262 of the spark ignitor electrode 260 and the outer surface 271 of the wall 202 of the combustion chamber 200. Specifically, the washer 264 is placed over the aperture 266 and the ceramic insulator 112 of the spark ignitor electrode 260 is inserted into the through-hole 104. The mounting flange 262 of the spark ignitor electrode 260 is placed over the washer 264 in alignment with the aperture 266 so that the screw 108 can be inserted through the center 265 of the washer 264 and into the aperture 266. With this orientation, a space or gap 270 is provided between the bottom of the spark ignitor electrode mounting flange 262 and the upper surface 271 of the combustion chamber wall 202. This gap allows air to flow from the combustion chamber through the annular area 280 (see FIG. 15) provided by the clearance between the inner diameter of the through-hole 104 and the outer surface of the ceramic insulator 112 of the spark ignitor electrode, completing the vent, generally designated by reference numeral 290.

Other configurations for creating a vent in the combustion chamber are also contemplated. For example, the vent may be formed by structures such as a chimney, a vent pipe, and the like.

Regardless of the way in which a gas passageway into the interior of the combustion chamber is formed, venting the combustion chamber as set forth according to the present invention eliminates the propensity of gas flow in the chamber to form a standing wave. A further benefit of the present invention is that, as used with an insect trapping device, the vent improves device function by lowering the plume temperature and raising the power production capability of the device's TE module (see the '351 and '243 patents).

The foregoing descriptions and drawings should be considered as illustrative only of the principles of the invention. The invention may be configured in a variety of shapes and sizes and is not limited by the dimensions of the preferred embodiment. Numerous applications of the present invention will readily occur to those skilled in the art. For example, the vented combustion chamber may be incorporated within a number of devices other than insect trapping devices. Therefore, it is not desired to limit the invention to the specific examples disclosed or the exact construction and operation shown and described. Rather, all suitable modifications and equivalents may be resorted to, falling within the scope of the invention.

What is claimed is:

1. A combustion device for generating an outflow of exhaust gas comprising a combustion chamber having a generally tubular body extending between an inlet and an outlet, said combustion chamber having a substantially horizontal orientation when in use, the exhaust gas exiting said outlet being drawn away from the combustion device by an exhaust fan, an exterior wall of said combustion chamber having a through-hole formed therein with a spark ignitor electrode assembly mounted in said through-hole, said combustion chamber further including a vent formed using said through-hole through which gas inside said chamber is vented to surrounding atmosphere during device operation to prevent formation of a standing wave in said chamber.

2. The combustion device as set forth in claim 1, wherein the device is part of an insect trapping apparatus.

3. The combustion device as set forth in claim 1, wherein the spark ignitor electrode assembly includes a spark ignitor electrode that is received within said through-hole and a spark ignitor electrode mounting flange, said spark ignitor electrode assembly mounting flange being mounted on top of a thermistor assembly mounting flange to create a gap between the spark ignitor electrode assembly mounting flange and the combustion chamber wall, said gap in combination with an annular clearance area between an outer surface of said spark ignitor electrode and an inner diameter of said through-hole forming said vent.

4. The combustion device as set forth in claim 1, wherein the vent is formed by a hole that extends through the wall into an interior of said combustion chamber, said hole having a cross-sectional area of about 0.025 square inches.

5. The combustion device as set forth in claim 1, wherein the vent is formed by a hole that extends through the wall into an interior of said combustion chamber, said hole having a cross-sectional area of no more than about 0.05 square inches.

6. The combustion device as set forth in claim 5, wherein the hole has a diameter of about 0.179 inches.

7. The combustion device as set forth in claim 1, wherein the spark ignitor electrode assembly includes a spark ignitor electrode that is received within said through-hole and a mounting flange, a spacer and a fastening element for securing the spark ignitor electrode to the combustion chamber wall, said spacer being positioned between said flange and said wall to create a gap between the flange and the wall, said gap in combination with an annular clearance area between an outer surface of said electrode and an inner diameter of said through-hole forming said vent.

8. The combustion device as set forth in claim 7, wherein said annular clearance area has a cross-sectional area of about 0.025 square inches.

9. The combustion device as set forth in claim 7, wherein said annular clearance area has a cross-sectional area of no more than about 0.05 square inches.

10. The combustion device as set forth in claim 9, wherein said gap is at least about 0.026 inches.

11. An insect attractant engine for an insect trapping device configured to be used with a fuel supply containing a combustible fuel, the engine comprising:
   a combustion device configured to provide an interior combustion chamber for continuous combustion of the combustible fuel therein to create an exhaust gas including carbon dioxide, an exterior wall of said combustion chamber having a through-hole formed therein with a spark ignitor electrode assembly mounted in said through-hole;
   an exhaust outlet configured to receive the exhaust gas;
   an air movement generator for pulling the exhaust gas away from the exhaust outlet and creating an air flow through said combustion chamber; and
   a vent formed using said through-hole in the exterior wall of said combustion chamber through which gas may be vented to surrounding atmosphere from said chamber during said continuous combustion to prevent formation of a standing wave in said chamber.

12. The insect attractant engine as set forth in claim 11, wherein the vent is formed by a hole that extends through the wall into an interior of said combustion chamber, said hole having a cross-sectional area of no more than about 0.05 square inches.

13. The insect attractant engine as set forth in claim 11, wherein said air movement generator is an exhaust fan.

14. The insect attractant engine as set forth in claim 11, wherein said combustion chamber has a generally tubular configuration that is substantially horizontal in orientation during operation.

15. The insect attractant engine as set forth in claim 14, wherein said spark ignitor electrode assembly includes a spark ignitor electrode that is received within said through-hole and a mounting flange, said spark ignitor electrode assembly mounting flange being mounted on top of a thermistor assembly mounting flange to create a gap between the spark ignitor electrode assembly mounting flange and the combustion chamber wall, said gap in combination with an annular clearance area between an outer surface of said electrode and an inner diameter of said through-hole forming said vent.

16. The insect attractant engine as set forth in claim 14, wherein said spark ignitor electrode assembly includes a spark ignitor electrode that is received within said through-hole and a mounting flange, a spacer and a fastening element for securing the electrode to the combustion chamber wall, said spacer being positioned between said flange and said wall to create a gap between the flange and the wall, said gap in combination with an annular clearance area between an outer surface of said electrode and an inner diameter of said through-hole forming said vent.

17. The insect attractant engine as set forth in claim 16, wherein said annular clearance area has a cross-sectional area of about 0.025 square inches.

18. The insect attractant engine as set forth in claim 16, wherein said annular clearance area has a cross-sectional area of no more than about 0.05 square inches.

19. The insect attractant engine as set forth in claim 18, wherein said gap is at least about 0.026 inches.

\* \* \* \* \*